(12) United States Patent
Salonaho et al.

(10) Patent No.: US 6,982,959 B1
(45) Date of Patent: Jan. 3, 2006

(54) MEASUREMENT REPORTING IN A TELECOMMUNICATION SYSTEM

(75) Inventors: Oscar Salonaho, Helsinki (FI); Kari Sipila, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/622,241

(22) PCT Filed: Feb. 9, 1999

(86) PCT No.: PCT/FI99/00095

§ 371 (c)(1),
(2), (4) Date: Sep. 25, 2000

(87) PCT Pub. No.: WO99/43177

PCT Pub. Date: Aug. 26, 1999

(30) Foreign Application Priority Data

Feb. 17, 1998 (FI) ........................................ 980358

(51) Int. Cl.
*H04B 7/212* (2006.01)
*G06F 11/00* (2006.01)

(52) U.S. Cl. .................. 370/252; 370/332; 455/67.11; 455/437

(58) Field of Classification Search ............... 370/252, 370/331, 332, 333; 455/67.11, 67.13, 63.1, 455/450, 437
See application file for complete search history.

(56) References Cited

U.S. PATENT DOCUMENTS

| | | | |
|---|---|---|---|
| 5,594,949 A | 1/1997 | Andersson et al. | ............ 455/62 |
| 5,634,192 A | 5/1997 | Meche et al. | ............ 455/33.2 |
| 5,970,407 A | 10/1999 | Brunner et al. | ............ 455/437 |
| 6,035,197 A | 3/2000 | Haberman et al. | ............ 455/439 |

FOREIGN PATENT DOCUMENTS

| | | |
|---|---|---|
| WO | WO 95/04419 | 2/1995 |
| WO | WO 97/08911 | 3/1997 |
| WO | WO 98/57512 | 12/1998 |

*Primary Examiner*—Afsar Qureshi
(74) *Attorney, Agent, or Firm*—Harrington & Smith, LLP

(57) ABSTRACT

The present invention relates to defining triggers or threshold values for radio signal parameters that are used for determining whether or not to send a measurement report separately for the uplink and downlink direction. The triggers for the uplink and downlink are logically combined so that a measurement report may be sent when measurements in both the uplink and downlink satisfy the triggers, when either measurement does, or when only one of the uplink or downlink measurement does. Preferably, the measurement report is a mobile evaluated handover measurement report triggering a handover. It is preferably triggered in the mobile station when at least one upper threshold of the radio signal parameters for a mobile evaluated handover is exceeded or a lower threshold is gone under.

26 Claims, 8 Drawing Sheets

MEASUREMENT REPORTING IN A TELECOMMUNICATION SYSTEM

CROSS REFERENCE TO RELATED APPLICATION:

This application claims priority to Finnish Patent Application Serial No. 980358, filed on Feb. 17, 1998, through PCT International Application No. PCT/FI99/00095, filed on Feb. 9, 1999.

FIELD OF THE INVENTION

This invention concerns reporting of measurements on radio interface in a telecommunication system.

BACKGROUND OF THE INVENTION

In mobile telecommunication systems mobile stations MS can use the services provided by the network using radio connections. The radio connection uses the channels of called radio interface between the mobile station and a base station of the mobile telecommunication network. Only a limited bandwidth on the radio spectrum is allocated to be used by the telecommunication systems. To gain capacity enough, the channels must be used again as densely as possible. To achieve this, the coverage area of the system is divided into cells, each cell being served by one base station. Due to this, the mobile telecommunication systems are often also called cellular systems.

The network elements and the internal relation between the network elements of a mobile telecommunication system are presented in FIG. 1. The network presented in the figure is in accordance with the UMTS system currently being standardized by ETSI (European Telecommunications Standards Institute). The network comprises base stations BTS (Base Transceiver Station), that can establish connections with the mobile stations MS, Radio Network Controllers RNC controlling the usage of base stations and Mobile Switching Centers MSC controlling the RNC's. In addition, the network comprises a Network Management System NMS, with the help of which the operator can modify the parameters of the other network elements. The interface between the MSC and the RNC's is generally called the Iu interface. The interface between the RNC's and the BTS's is the Iubis interface and the interface between the BTS and the MS's the radio interface. According to some proposals, an interface Iur between the RNC's is specified.

The calls of a mobile station are routed from the BTS via the RNC to the MSC. MSC switches the calls to other mobile switching centers or to the fixed network. The calls can as well be routed to another mobile station under the same MSC, or possibly even under the same BTS.

The radio interface between the base stations and the mobile stations may be divided into channels using a plurality of divisions. Known methods of division are, for example, Time Division Multiplexing TDM, Frequency Division Multiplexing FDM and Code Division Multiplex CDM. In TDM systems, the spectrum allocated for the system is divided into successive time frames consisting of time slots, each time slot defining one channel. In FDM the channel is defined by the frequency used in the connection. In CDM the channel is defined by the spreading code used in the connection. These methods can be used separately or be combined.

To be able to successfully communicate with the mobile telecommunications network, the mobile station continuously monitors the radio signals sent by the base stations. In the idle mode the mobiles decode the strongest signal received, and when needed request the establishment of a connection from the base station transmitting this signal.

During an active connection, the connection can be moved from one base station to another. The connection can be moved from one base station to another by simply rerouting the signal, which is called hard handover. The system interference can be decreased and thus the capacity increased especially in CDMA (Code Division Multiple Access) systems utilizing CDM by using soft handovers in which the mobile has simultaneously connections with a plurality of base stations, these base stations forming the so called active set of the connection.

The handover may be
- intra-cell handovers
- inter-cell handovers between two base stations under the same radio network controller
- inter-RNC handovers between two RNC's under the same MSC, or
- inter MSC handover between two cells under different MSC's.

In addition, the handover can be divided into intra-frequency handovers in which all the channels involved in the handover procedure are on the same frequency and inter-frequency handovers, in which there are channels from at least two frequencies involved in the handover procedure.

To be able to establish the handovers to right base stations during an active connection, the mobile station continuously measures the radio signals from the base stations it is in connection with as well as their neighboring base stations. The measurement results are transmitted to the network using the measurement reporting scheme specified in the system. Based on the reports, the network initiates the handover when the mobile station would have a better or at least sufficiently good radio connection to another base station.

In addition to the network initiated handovers, also mobile evaluated handovers are known. In an exemplary description of a mobile evaluated handover, the mobile station monitors the signal levels received from neighboring base stations and reports to the network those beacon signals which are above or below a given set of thresholds. Those thresholds can be dynamically adjusted as will be explained in the following. Based on this reporting scheme, the network will decide whether the active set of the connection is to be changed.

Two type of thresholds are used: the first one to report beacons with sufficient power to be used for coherent demodulation, and the second one to report beacons whose power has declined to a level where it is not beneficial to be used for receiving the sent information. Based on this information, the network orders the MS to add or remove base station signals from its active set.

While soft handover improves overall performance it may in some situations negatively impact system capacity and network resources. This is due to the unnecessary branches between the MS and the base stations in the active set. On the downlink direction from the base stations to the mobile station, excessive branch reduces system capacity while on the uplink direction from the mobile station to the base stations, it costs more network resources.

To solve this problem, the principle of dynamic thresholds for active set management is known in prior art. In this method, the MS detects beacons crossing a given static threshold T1. When crossing this threshold the beacon is moved to a candidate set. It is then searched more frequently and tested against a second dynamic threshold T2. This second threshold T2 will test if the beacon is worth adding to the active set.

When the beacons corresponding to the branches in the active set are weak, adding an additional branch signal, even a poor one, will improve performance. In these situations, a relatively low value of T2 is used. When there is one or more dominant beacons, adding an additional weaker branch whose beacon signal is above T1 will not improve performance but will utilize more network resources. In these situations a higher value of T2 is used.

After detecting a base station signal above T2, the MS will report it back to the network. The network will then set up the handover resources and order the MS to coherently demodulate the signal of this additional branch.

Beacons can be dropped from the active set according to the same principles. When the beacon strength decreases below a dynamic threshold T3, the handover connection is removed, and the beacon is moved back to the candidate set. The threshold T3 is a function of the total energy of beacons in the active set. When beacons in the active set are weak, removal a branch, even a weak one, will decrease performance. In these situations, a relatively low value of T3 is used. When there is one or more dominant branches, removal of a weaker signal will not decrease performance but will make the utilization of the network resources more efficient. In these situations a higher value of T3 is used. Branches not contributing sufficiently to the total received energy will be dropped. When further decreasing below a static threshold T4 a beacon is removed from the candidate set.

To be able to control the connection, the network needs in different situations different kinds and different amount of measurement information. The more information is sent the more efficient the handover algorithm are. However, the more information the mobile station sends the network, the more radio resources are spent. Thus, the measurement reporting schemes according to prior art are always compromises between the efficiency of the handover algorithms and the usage of radio resources.

WO9802010 relates to a process and a device in a radio communication system for observing the quality of channels that are to be used in uplink and channels that are to be used in downlink. A quality parameter, for example the interference, is measured for both uplink channels and downlink channels from a measurement receiver comprised in each base station. The measured interference is an approximation to the real downlink interference. The approximation has best correspondence with the real interference situation when the base station and the mobile stations are placed at similar height, for instance in micro- and pico cells. The measurement values can be used for adaptive allocation of frequencies or channels, or for giving statistical information about the radio communication system.

As the usage of mobile telecommunication systems and multimedia applications requiring large bandwidths is growing, the present methods are no longer sufficient, thus limiting the performance of the mobile telecommunication networks. The objective of the present invention is a flexible measurement reporting scheme which solves this problem.

SUMMARY OF THE INVENTION

The basic idea of this invention is to define triggers, e.g. threshold values for radio signal parameters, for sending a measurement report separately for downlink and uplink directions. In addition, it is specified how the outputs of these triggers are to be combined. For example, it may be determined whether the measurement report is to be sent, for example, when both the uplink and downlink conditions are met, when either of them is met, based entirely on the uplink conditions or based entirely on the downlink conditions.

The measurement report types is preferably a mobile evaluated handover measurement report triggering a handover. Such a report is triggered in the mobile station when at least one upper threshold of the radio signal parameters for a mobile evaluated handover is exceeded or lower threshold gone under.

BRIEF DESCRIPTION OF THE FIGURES

The invention is described more closely with reference to the accompanying schematic drawings, in which.

DETAILED DESCRIPTION OF THE INVENTION

Figure 1:
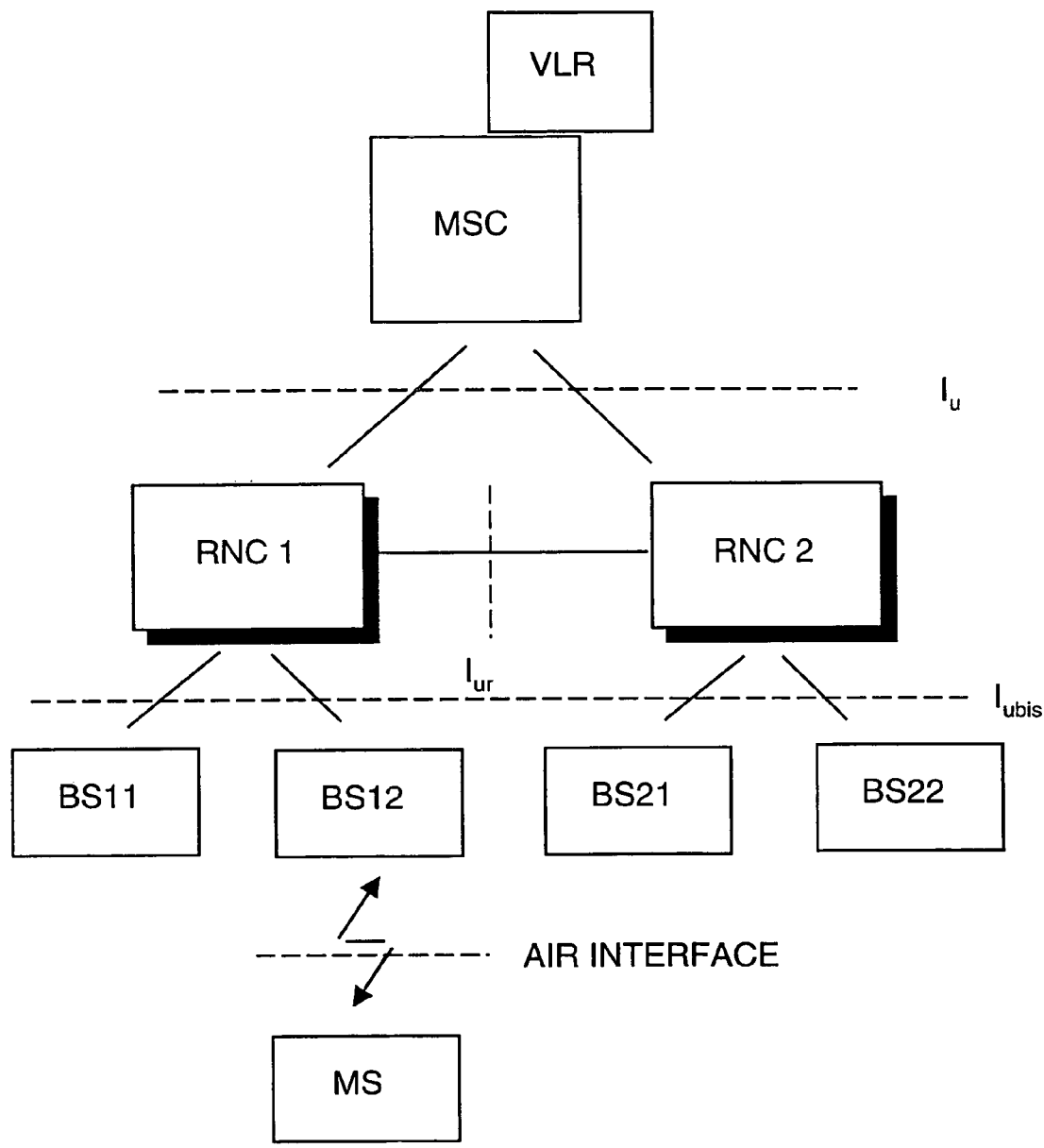
FIG. 1 shows a mobile telecommunication system.

In the following, preferred embodiments of the invention are studies further.

In this context mobile evaluated handover means, that a handover measurement algorithm situated in the mobile triggers the handover report. The actual HO decision is always performed by the network. The handover report types can be further divided into intra-frequency and inter-frequency handover report types.

The Intra-Frequency Handover

The algorithm presented in the following includes the possibility to use information about the downlink (DL), uplink (UL) or both as the trigger for the HO report. Also this scheme provides a flexible means to control the information content of the HO report. The actual thresholds and timers in the algorithm are selected to be such, that a wide variety of HO algorithms can be constructed by the appropriate setting of these.

The mobile station continuously performs measurements on the radio signals from different BTS's according to the procedure described in the following.

The mobile determines the received power of the beacon channel for BTSi. This power is denoted as Prx,i (mW). The MS performs this measurement for time period t (a parameter set by network). The value of $P_{rx,i}$ is averaged over the measurement period. The result of this operation is denoted as $P\_ave_{rx,i}$. When the measurement is completed, the path loss estimate, denoted as Li (dB), is calculated as:

$$L_i = -10\log_{10}\left(\frac{P\_ave_{rx,i}}{P\_beacon_{tx,i}}\right). \quad (1)$$

In (1), the unit of $P\_beacon_{tx,i}$ is mW.

During the same measurement period t the MS also estimates the interference power of the beacon channel before or after (this is preferably a parameter defined by the network) correlating the received sum signal with the spreading code. The values calculated before or after the correlation differ due to the fact that the correlation remarkably reduces the interference caused by other connections. This interference is denoted as $I_i$ (mW). The interference is also averaged over the measurement period. After the averaging has been performed, the average value is converted into dBm. This average is denoted as I_ave$_i$.

The MS is also to receive, e.g. on the beacon channel, the DL_offset value of BTS$_i$, denoted as DL_offset$_i$ (dB), which is a relatively stable parameter and there is thus no need to re-receive it for each measurement period. The purpose of this base station specific parameter is to specify for different cell sizes. The mobiles are handed over from a first set of cells more willingly than from a second set of cells. These cells of the first set thus become smaller than the cells of the other set. The offset value can be seen as an additional base station specific part of the threshold values that are soon to be presented more closely.

From the above information the MS is to calculate one DL HO measurement S$_{dl,i}$ sample as $$S_{dl,i}=L_i+I_{ave,i}+DL\_offset_i \quad (2)$$

It is to be noted that the larger the value of S$_{dl,i}$, the worse the link from the base station to the mobile station is. The scope of this invention is not limited to the use of this particular measure, but other measures of the link quality may as well be used when implementing the present invention. As one example, the bit error ratio BER in the received radio signal can be used as the measure.

The MS is also to receive, e.g. on the beacon channel, the total interference power, I$_{ul,i}$ (dBm) at the BTS$_i$ and the UL offset value, UL_offset$_i$ (dB) of BTS$_i$. The MS is then to calculate the value of one UL HO measurement sample as $$S_{ul,i}=L_i+I_{ul,i}+UL\_offset_i \quad (3)$$

When these measurements and calculations have been performed for BTS$_i$ the MS is then to place the results as the first elements in the vectors L_vect$_i$ (for the value of L$_i$), S_vect$_{dl,i}$ (for the value of S$_{dl,i}$) and S_vect$_{ul,i}$ (for the value of S$_{ul,i}$). The last element of these vectors is discarded. The vectors comprise the history of the measurement results. The length of the history maintained, defined by the length n of these vectors is a network parameter.

Having performed the measurements for this base station signal the MS checks whether a MEHO (Mobile Evaluated HandOver) report is to be transmitted according to the HO algorithm described in the following. The argument of the algorithm may be for instance either median or mean of the vectors S_vect$_{dl,i}$ and S_vect$_{ul,i}$, and is preferable defined by the network. In addition, the MS starts to measure the beacon signal transmitted by the next BTS BTS$_{i+1}$.

The HO algorithm is used to trigger the transmission of the MEHO measurement report. In the algorithm the UL and DL directions of transmission are treated separately. So actually two algorithms can function in the MS independently. The network can command the MS to use either one of them or both for the triggering of measurement report transmission. It should be noted, however, that the active set is always the same for both directions of transfer.

The algorithm includes the below thresholds:

1. Branch addition threshold denoted in this document as BA_abs$_{th}$ and BA_rel$_{th}$,
2. Branch deletion threshold denoted in this document as BD_abs$_{th}$ and BD_rel$_{th}$, and
3. Branch replacement threshold denoted in this document as BR_rel$_{th}$ For the thresholds 1 and 2, both an absolute and a relative threshold are defined. Separate values can be defined for the uplink and the downlink directions. The thresholds are used in Branch Addition (BA), the Branch Deletion (BD) and the Branch Replacement (BR) decision units. These units may be implemented as hardware units, software blocks or a combination of these.

Figure 2:
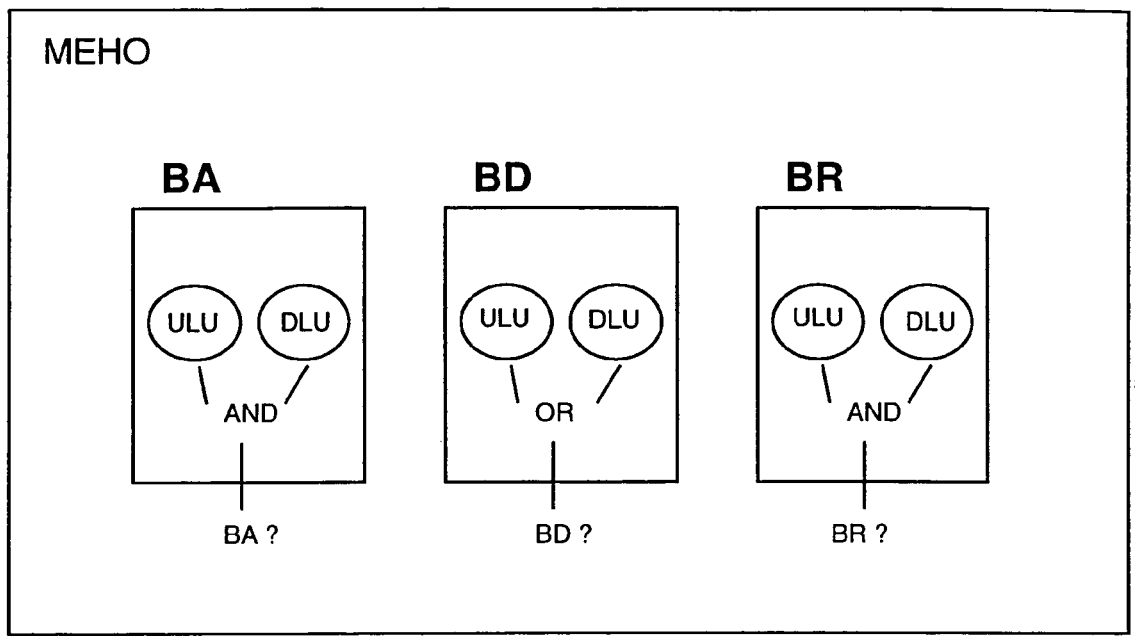
FIG. 2 shows the structure of a MEHO algorithm.

The basic structure of these algorithms is presented in FIG. 2. The uplink comparison unit ULU compares the measurement results of the uplink radio signals to triggers defined by the thresholds set to these signals, and outputs a logical truth value. The downlink comparison unit DLU compares the measurement results of the downlink radio signals to triggers defined by the thresholds set to these signals, and outputs a logical truth value. The results of ULU and DLU are combined to one logical signal using a logical function. The logical value may be, for example, AND or OR function, or a function outputting directly one of the input values of the block. The truth value of this signal is verified, and a report is sent if the truth value is TRUE, for example. Of course, using a different logical function when combining the outputs of ULU and DLU, it can be defined that the report is sent if the truth value is FALSE.

The parallel decision units BA, BD and BR shown in FIG. 2 are used in different situations. BA is used when the base station is not in the active set of the connection, and the number of links between the MS and BTS's in the active set is less than a given limit N$_{AS,max}$. The value of N$_{AS,max}$ is a preferably a parameter set by the network.

BD is used when the base station is in the active set of the connection. To prevent ping-pong effect, the logical functions of the BA and BD blocks must be consistent so that the same measurement values for a link between the MS and a BTS may not cause both the units to trigger a measurement report suggesting an addition or deletion of the same link. For example, if logical functions AND and OR are used, the value OR may not be used in both the decision blocks.

BR is used when the base station is not in the active set of the connection and the number of links between the MS and BTS's in the active set is equal to the limit N$_{AS,max}$. This decision unit is used to replace on link of the active set by another one having better radio characteristics.

Figure 3:
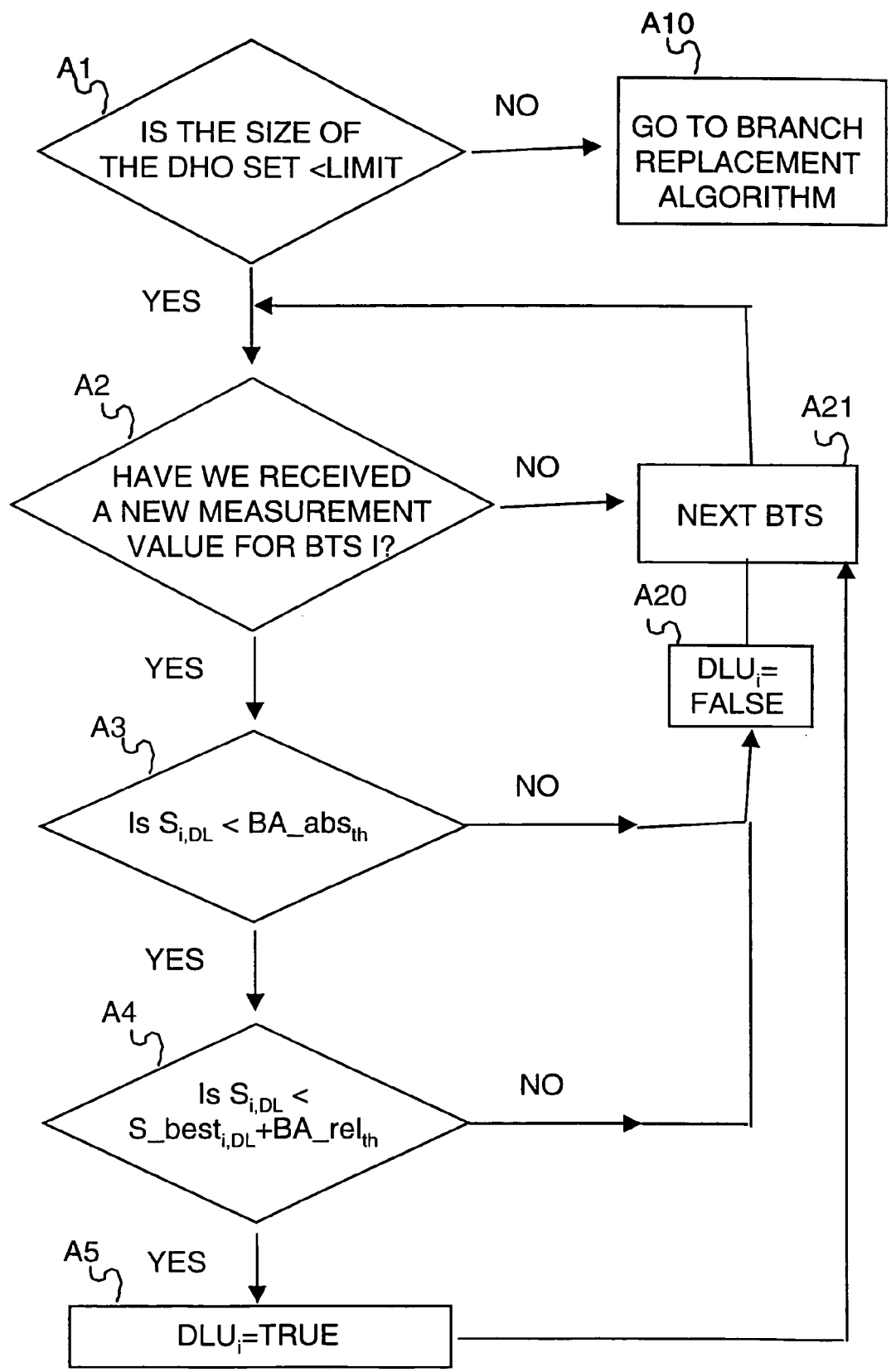
FIGS. 3, 4, 5, 6 and 7 each show a decision flow chart.

One algorithmic implementation of the downlink comparison unit DLU of the branch addition algorithm BA is shown in FIG. 3. The algorithm is used for beacon signals from base stations that do not belong to the active set. At stage A1 it is checked whether the number of base stations in the active set is less than a predefined limit, i.e. whether the active set is full. As an example, the limit 3 can be used here. If the active set is full, the branch replacement algorithm is selected instead of this algorithm (stage A10).

If the active set is not full the procedure proceeds to stage A2, A3 and A4, in which it is checked whether new measurement results have been received (stage A2), S$_{i,DL}$ is compared to absolute threshold BA_abs$_{th,DL}$, and S$^{i,DL}$ is compared to threshold S_best$_{i,DL}$+BA_rel$_{th,DL}$, in which S_best$_{i,DL}$ id the value measured for the best active branch.

If new results have been received and both the threshold values BA_abs$_{th,DL}$ and S_best$_{i,DL}$+BA_rel$_{th,DL}$ are higher than S$_{i,DL}$, the output of the DLU is set to TRUE.

The uplink branch can be implemented using a similar algorithm. If new results for the uplink have been received and both the threshold values BA_abs$_{th,UL}$ and S_best$_{i,UL}$+BA_rel$_{th,UL}$ are higher than S$_{i,UL}$, the output of the ULU is set to TRUE. The threshold values BA_abs$_{th,DL}$/BA_abs$_{th,UL}$ and BA_rel$_{th,DL}$/BA_rel$_{th,UL}$ used in different directions may be different from each other or identical.

The values of the DLU and ULU algorithms are inputted into the logical function, as shown in FIG. 2. MEHO measurement report is sent if the function outputs a value TRUE. For example, if the logical value used is AND, the MEHO measurement report is sent when both the ULU and DLU have value TRUE.

Figure 4:
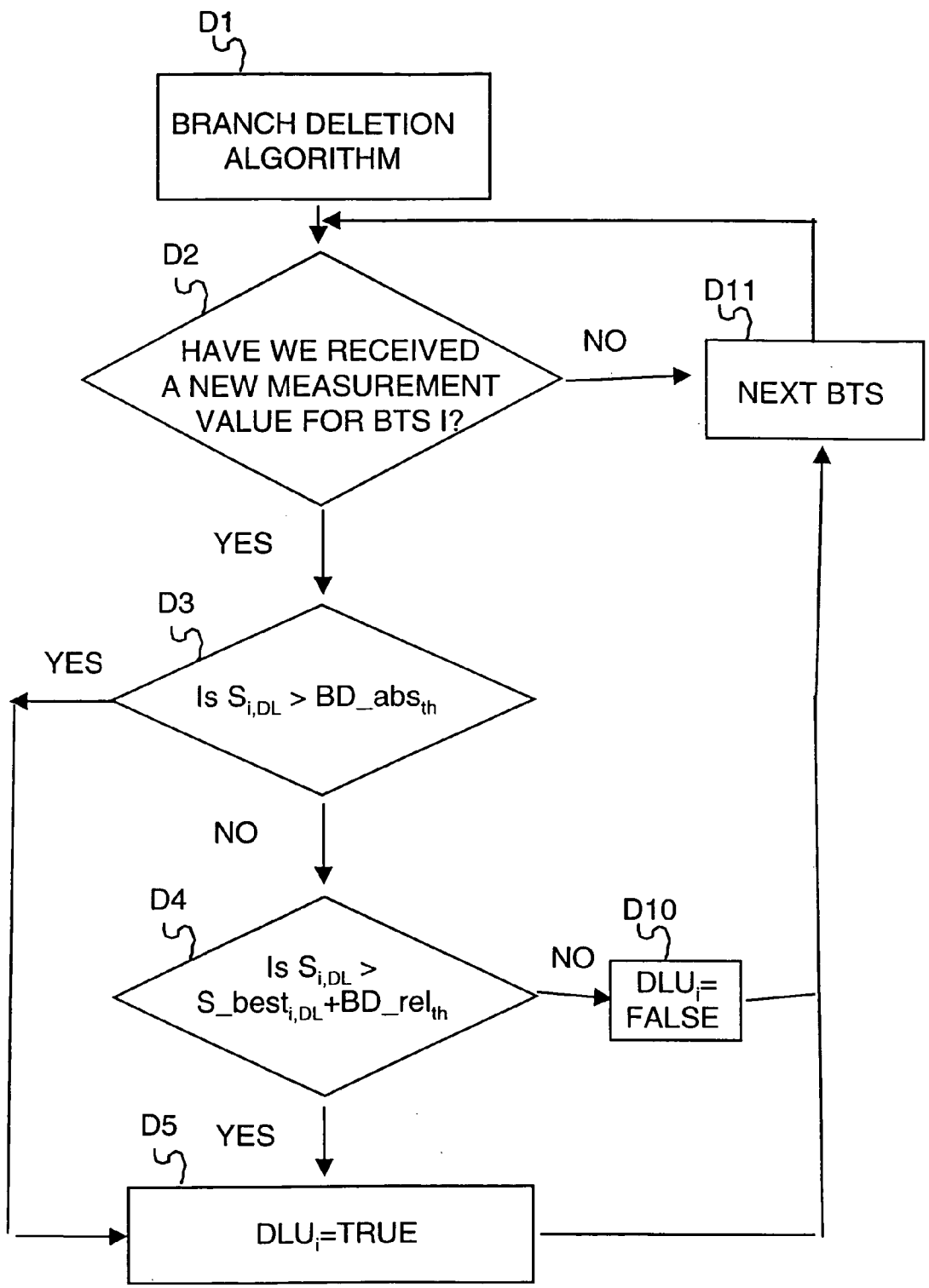

An algorithmic implementation of the downlink comparison unit DLU of the branch deletion algorithm BD is shown in FIG. 4. This algorithm is used for beacon signals from base stations that belong to the active set.

It is first checked whether new measurement results have been received (stage D2). The measurement result $S_{i,DL}$ is compared to thresholds $BD\_abs_{th,UL}$ (stage D3) and $S\_best_{i,DL}+BD\_rel_{th,UL}$ (stage D4). If either of these thresholds is lower than $S_{i,DL}$, the DLU is set to TRUE (stage D5). Otherwise, DLU is set to FALSE (stage D10) and the next beacon signal in the active set is measured.

A similar comparison in made between the uplink measurement results and uplink thresholds to define the value of ULU. DLU and ULU are combined using a logical function defined by the network to make a decision whether to send or not to send a MEHO measurement report. To prevent the ping-pong effect, the logical function used is selected so that the same measurement results never cause the BA to request the addition of a branch and the BD to delete the same branch. To meet this requirement, only one of the logical functions used in BA and BD algorithms according to the same reporting option may be a logical OR function. This is depicted in the following table for two different options for measurement reporting:

|  | Logical function for BA | Logical function for BD |
| --- | --- | --- |
| Option 1 | AND | OR |
| Option 2 | OR | AND |
| Option 3 | AND | AND |

Figure 5:
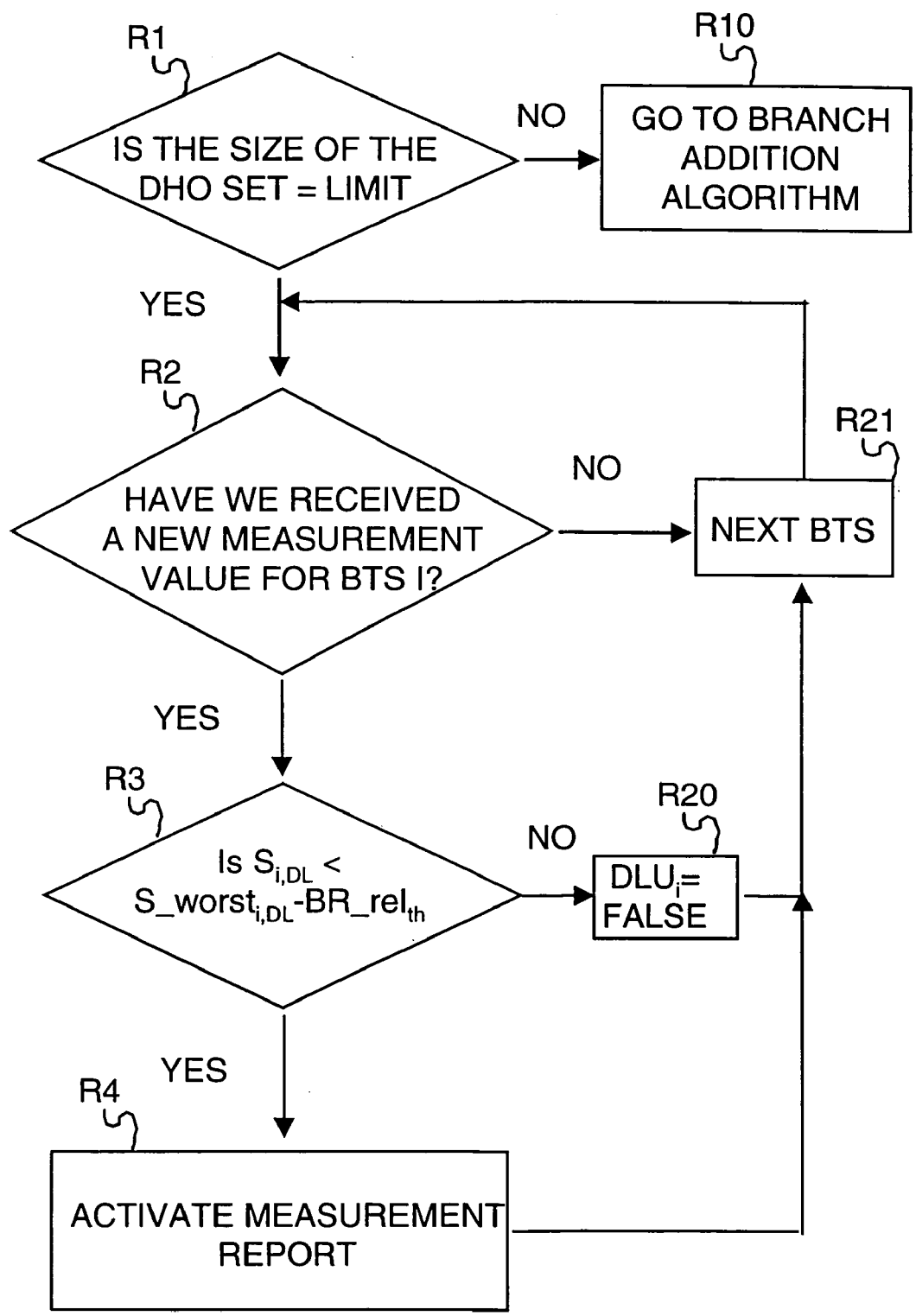
Figure 6:
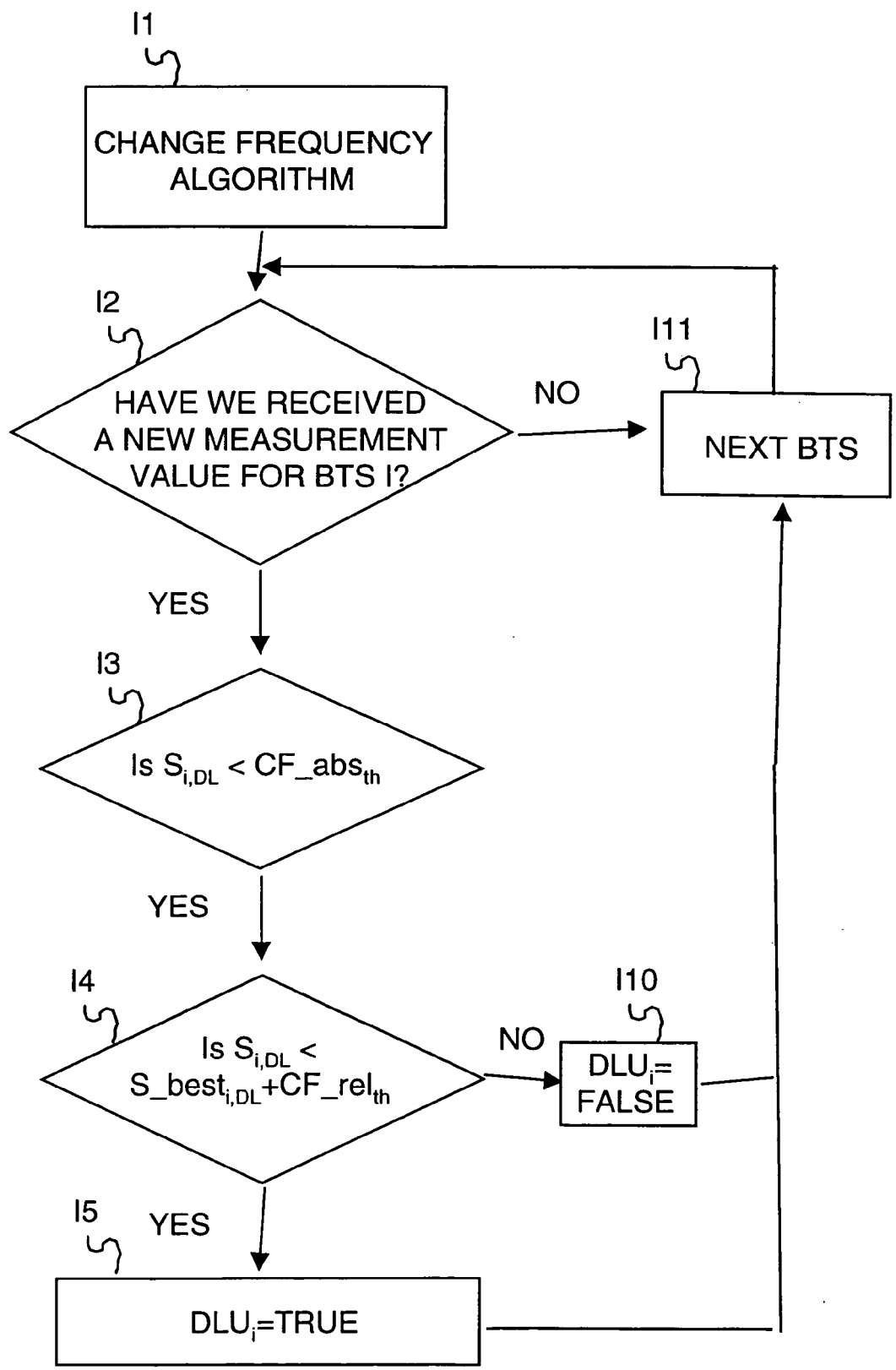

An algorithmic implementation of the downlink comparison unit DLU of the branch replacement algorithm BR is shown in FIG. 5. The algorithm is used for beacon signals from base stations that do not belong to the active set. At stage R1 it is checked whether the number of base stations in the active set is equal a predefined limit, i.e. whether the active set is full. As an example, the limit 3 can be used here. If the active set is not full, the branch addition algorithm is selected instead of this algorithm (stage R10).

If the active set is full the procedure proceeds to stage in which it is checked whether new measurement results have been received (stage R2). If no new measurement results have been received, the next beacon signal is studied. If new measurement result $S_{i,DL}$ has been received it is compared at stage R3 to the measurement value $S\_worst_{i,DL}$ of the worst link in the active set. If $S\_worst_{i,DL}$ exceeds $S_{i,DL}$ with a margin of $BR\_rel_{th}$ DLU is set to TRUE (stage R4). Otherwise ULU is set to FALSE (stage R20) and the measurements on a next BTS not belonging to the active set studied.

The uplink branch can be implemented using a similar algorithm. In this comparison, $S_{i,UL}$ is compared to $S\_worst_{i,DL}$ of the worst link in the active set. If $S_{i,DL}$ exceeds $S\_worst_{i,DL}$ with a margin of $BR\_rel_{th}$ DLU is set to TRUE. The margin values $BR\_rel_{th}$ are preferably identical in downlink and uplink directions, but also different values in different directions can be used. This is a parameter that is defined by the network. DLU and ULU are combined using a logical function to make a decision whether to send or not to send an MEHO measurement report. The logical function is preferably an logical AND function. In another preferred embodiment, the logical function can be adjusted freely by the network. The output of the logical function can be, e.g. the truth value of DLU or ULU.

When the MEHO algorithms in the mobile station trigger the measurement report the status of the M best cells/sectors is transmitted. The transmitted measurement report is always to include the appropriate values for the active set. The M best cells/sectors are determined by using the values of $S_{i,dl}$ or $S_{i,ul}$ depending on whether it was DL or UL algorithm that triggered the report. The contents of the report is preferably determined with an message sent from the network. The measurement report includes, e.g. the following values for each celVsector to be reported. These values are the filtered values.

1. $S_{i,dl}$
2. $S_{i,ul}$
3. $L_i$

It should be noted, that the measurement report can include information only about neighbour BTSs whose beacon signals have been decoded. Thus the handover report has to include the information of the number of BTSs that are being reported.

Also the information included in the measurement report may preferably be defined by the network. For example, the number of beacon signals whose power level is to be reported in a measurement report is preferably defined by the network.

The Inter-Frequency HO

The inter-frequency measurements are always initiated by the network. Thus the mobile can perform inter-frequency MEHO only after the network has first commanded the MS to start the inter-frequency HO measurements.

There are at least three different reasons for inter-frequency HO:

1. Coverage. The MS is e.g. exiting the coverage area of a microcell and has to hand over to a macrocell. This case may be relatively simple. For example if the branch deletion has triggered a measurement report and only one branch is active the conclusion by the network is, that the MS is exiting the coverage area. The network responds to this by transmitting a message 'start i-f measurements'. This message includes the possible candidate BTSs. The mobile would then start searching for a stronger BTS on the other frequency. The transmission of the measurement report is triggered when the MS finds a candidate BTS on the other (new) frequency that is stronger than the best active branch on the current frequency.

2. Load. If for some reason the load on the used frequency is higher than on some other available frequency an inter-frequency HO may be appropriate. This situation would probably be known only by the network. After the network has detected the overload situation the actions are the same as in case 1

3. Mobile speed. The speed of the MS is so high, that an excessive amount of handovers are needed if the MS is connected to the microcell layer. This is an item for further study. The most crucial question is the detection of the MS speed. That is, there a method to reliably estimate the MS speed? Can the received beacon powers be measured often enough to be able to use fast fading based methods? What signalling does the MS use to indicate its' speed if the estimation is in the mobile?

After the MS has been commanded by the network to start the inter-frequency measurements the MS is to perform the measurements on the frequency given in the start measurement command.

The algorithm is used to trigger the transmission of the inter-frequency measurement report. In the algorithm the UL and DL directions of transmission are treated separately. So, actually two decision algorithms, DLU and ULU function in the MS independently. The outputs of these algorithms are combined as shown in FIG. 2 to make the final decision concerning sending the measurement report. The network can command the MS to use either one of them or both for the triggering of measurement report transmission. It should however be noted, that the active set is always the same for both directions of transfer.

Figure 7:
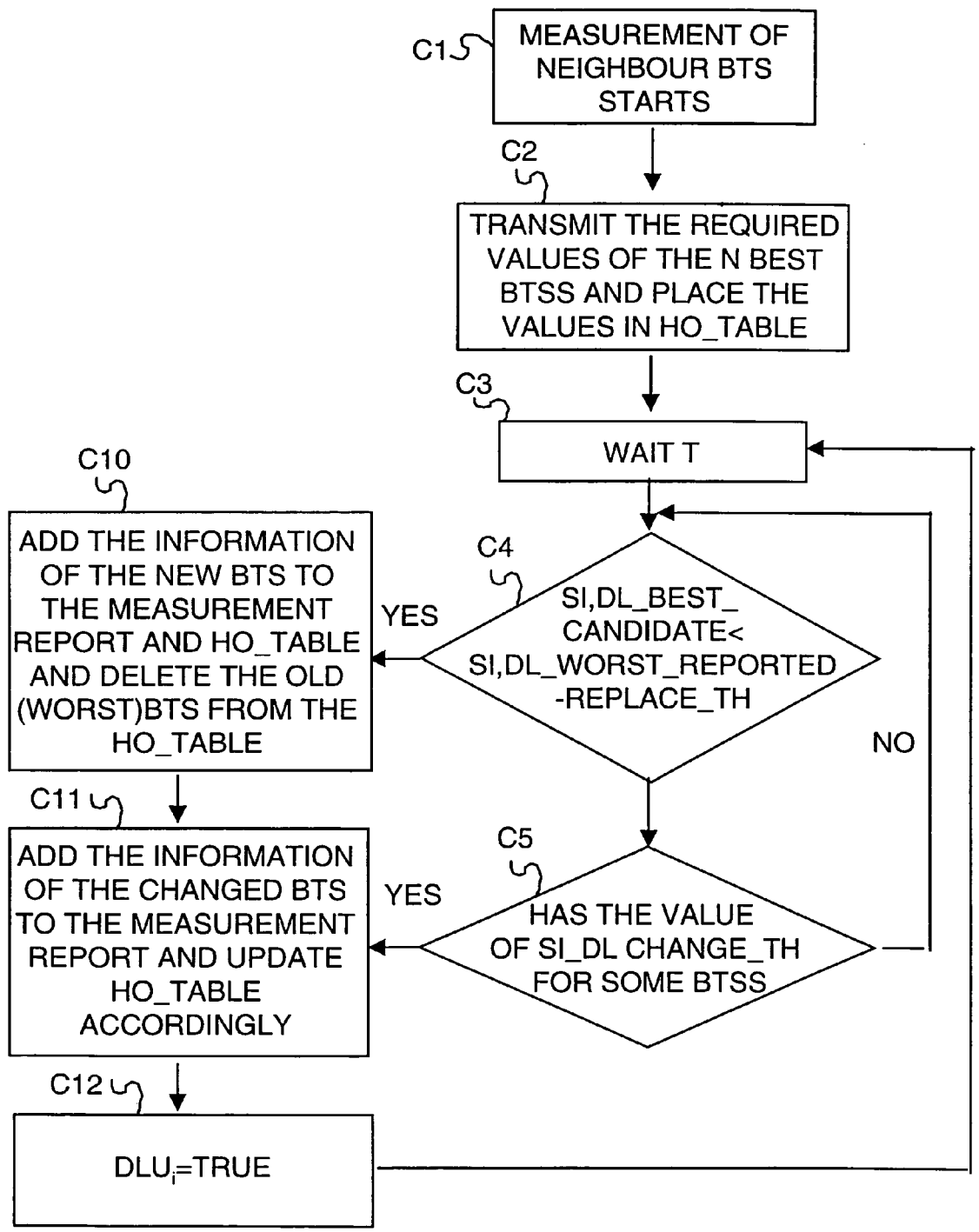

The algorithm includes the below threshold. For the threshold an absolute and a relative threshold $CF\_abs_{th}$ and $CF\_rel_{th}$ are defined. The decision flow chart for DLU unit of the algorithm is shown in FIG. 7.

If new measurement results have been acquired in the new frequency not belonging to the active set, the link losses the beacon signal is suffering are compared to an absolute threshold $CF\_abs_{th}$. If the quality of the link is sufficient it is compared to the best link in the active set. If the quality is better with a predetermined margin the output of the DLU algorithm is set to TRUE.

A similar algorithm ULU is run for downlink direction. The outputs of DLU and ULU are combined using a logical function as described earlier.

When the HO algorithms trigger the inter-frequency measurement report the status of the M best cells/sectors is transmitted. The M best cells/sectors are determined by using the values of $S_{i,dl}$ or $S_{i,ul}$ depending on whether it was DL or UL algorithm that triggered the report. The contents of the report is determined with a message sent from the network. The measurement report includes, e.g. the following values for each cell/sector to be reported. These values are the filtered values.

1. $S_{i,dl}$
2. $S_{i,ul}$
3. $L_i$

It must be noted that the possible logical functions are not limited to those presented in the examples above. For instance, if the outputs of the DLU and ULU functions are not binary but have more levels or are even continuous functions triggered by some events on the radio signals in respective directions, fuzzy logical functions can be used when making the decision whether to send or not to send a measurement report based on the outputs of the functions DLU and ULU. The fuzzy logical functions are preferably given by the network.

Figure 8:
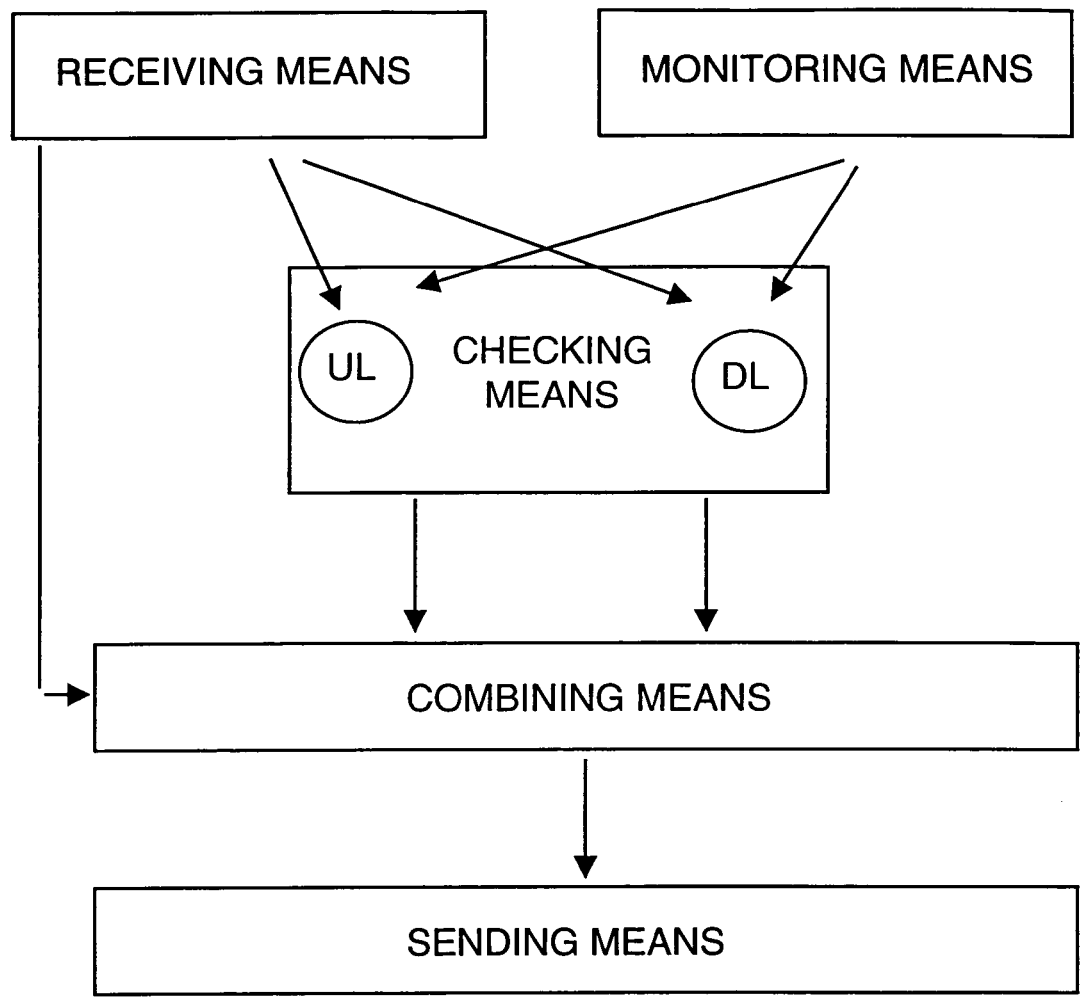
FIG. 8 shows functional entities in a mobile station.

A mobile station according the invention is shown in FIG. 8. As its characteristics, the mobile station has receiving means for receiving information about first and second set of trigger conditions corresponding, respectively, to uplink and downlink signals and a logical function, monitoring means for monitoring the radio signals, checking means which is responsive to the receiving means and the monitoring means and which has the functionality of checking the state of each trigger conditions, combining means responsive to the checking means for combining the states according to the logical function, and sending means responsive to the combining means for sending a measurement report to the base station.

According to a preferred embodiment, the receiving means are arranged to receive a first combination of a first and a second set of trigger conditions and the logical function and a second combination of a first and a second set of trigger conditions and the logical function, and the checking means and the combining means are arranged to use the first combination for radio signals from or to active base stations having an active link with the mobile station and the second combination is used for radio signals from or to candidate base stations not having an active link with the mobile station.

The measurement reporting scheme according the invention provides flexible means for reporting measurement results. The advantage of the flexibility is that the measurement reporting can be adjusted to provide the network the necessary information while minimizing the amount of radio resources spent for the measurement reporting purposes.

The invention has been described above by means of preferred embodiments to illustrate the principles of the invention. As regards the details, the invention may vary within the scope of the attached claims.

What is claimed is:

1. A method of measurement reporting in a telecommunication system comprising mobile stations and a network comprising base stations, wherein decisions upon establishing or canceling a communication link between a mobile station and a base station are made in the network on the basis of measurement reports sent from the mobile station to the network, characterized in that the method comprises the steps of defining first and second sets of trigger conditions corresponding, respectively, to radio signal properties in the uplink and downlink directions, defining a logical function for combining said first and second sets of trigger conditions, at the mobile station, determining the state of each trigger condition, combining the states according to the logical function, and sending a measurement report to a base station in dependence upon the condition of the logical function.

2. A method according to claim 1, characterized in that the first and second set of trigger conditions are dynamically defined by the network.

3. A method according to claim 1, characterized in that the logical function is defined by the network.

4. A method according to claim 1 characterized in that a first combination of the first and second sets of trigger conditions and the logical function are defined to be used for radio signals from or to active base stations having an active link with the mobile station, and a second combination of the first and second sets of trigger conditions and the logical function are defined to be used for radio signals from or to candidate base stations not having an active link with the mobile station, and at the mobile station, the first combination is used for radio signals from or to active base stations having an active link with the mobile station and the second combination is used for radio signals from or to candidate base stations not having an active link with the mobile station.

5. A method according to claim 4, and comprising the step of creating an active link between the mobile station and a candidate base station not having an active link with the mobile station when the network receives from the mobile station a measurement report triggered by the radio signals from or to that candidate base station.

6. A method according to claim 4, and comprising the step of deleting an active link between the mobile station and a base station when the network receives from the mobile station a measurement report triggered by the radio signals from or to that active base station.

7. A method according to claim 4, characterized in that said two different logical functions are such that when a base station is in the active set, a measurement report is not triggered by a radio signal of that base station for the same set of radio properties as would trigger the transmission of a measurement report when the base station is in the candidate set.

8. A method according to claim 1, characterized in that the method comprises a step of defining a logical function for use when the number of base stations in the active set-is equal to a predefined maximum number, and defining the first and second sets of trigger conditions is on the basis of the radio signal properties of the active base station having the worst signal conditions, and wherein a measurement report triggered by a radio signal of a candidate base station causes that worst base station to be replaced by the candidate base station.

9. A method according to claim 8, characterized in that the maximum number is dynamically defined by the network.

10. A method according to claim 1, characterized in that at least one of the trigger conditions is a condition for the received power level or a Junction thereof.

11. A method according to claim 1 characterized in that at least one of the trigger conditions is a condition for the interference in the received radio signal or a function thereof.

12. A method according to claim 1, characterized in that at least one of the sets of trigger conditions is a condition for the change of the parameters of the received radio signals or a function thereof.

13. A method according to claim 1, characterized in that the trigger conditions comprise at least one base station specific offset value.

14. A method according to claim 13, characterized in that at least one of the offset values is dynamically defined by the network.

15. A method according to claim 1, characterized in that the network informs the mobile station what information to include in the measurement report, and the mobile station includes this information in the measurement report.

16. A method according to claim 15, characterized in that the radio signals are ordered using a predefined condition, and in the measurement report sent from the mobile station, information about the properties of a predefined number of the best radio signals according to the condition are reported.

17. A method according to claim 15, characterized in that the number of radio signals to be reported is given by the network.

18. A method according to claim 15, characterized in that the measurement report comprises a value for the path loss for a reported signal or a function thereof.

19. A method according to claim 15, characterized in that the measurement report comprises a value for the carrier to interference ratio of a reported signal of a function thereof.

20. A method of measurement reporting in a telecommunication system comprising mobile stations and a network comprising base stations, wherein decisions upon establishing or canceling a communication link between a mobile station and a base station are made in the network on the basis of measurement reports sent from the mobile station to the network, the network using CDMA air interface in which the connections are divided using different spreading codes, characterized in that the method comprises:

defining first and second sets of trigger conditions corresponding, respectively, to radio signal properties in the uplink and downlink directions, wherein at least one of the trigger conditions is a condition for the interference in the received radio signal or a function thereof, and wherein the value for the interference is an estimate for the interference power made before the signal is correlated with the spreading code used in the connection;

defining a logical function for combining said first and second sets of trigger conditions, at the mobile station, determining the state of each trigger condition, combining the states according to the logical function, and sending a measurement report to a base station in dependence upon the condition of the logical function.

21. A method of measurement reporting in a telecommunication system comprising mobile stations and a network comprising base stations, wherein decisions upon establishing or canceling a communication link between a mobile station and a base station are made in the network on the basis of measurement reports sent from the mobile station to the network, the network using CDMA air interface in which the connections are divided using different spreading codes, characterized in that the method comprises:

defining first and second sets of trigger conditions corresponding, respectively, to radio signal properties in the uplink and downlink directions, wherein at least one of the trigger conditions is a condition for the interference in the received radio signal or a function thereof, and wherein the value for the interference is an estimate for the interference power made after the signal is correlated with the spreading code used in the connection;

defining a logical function for combining said first and second sets of trigger conditions, at the mobile station, determining the state of each trigger condition, combining the states according to the logical function, and sending a measurement report to a base station in dependence upon the condition of the logical function.

22. A mobile station for a telecommunication system comprising mobile stations and a network comprising base stations, wherein the mobile stations monitor the radio signals sent by the base stations, characterized in that the mobile station has receiving means for receiving information about first and second set of trigger conditions corresponding, respectively, to uplink and downlink signals and a logical function, monitoring means for monitoring radio signals, checking means which is responsive to the receiving means and the monitoring means and which has the functionality of checking the state of each trigger conditions, combining means responsive to the checking means for combining the states according to the logical function, and sending means responsive to the combining means for sending a measurement report to the base station.

23. A mobile station according to claim 22 characterized in that the receiving means are arranged to receive a first combination of a first and a second set of trigger conditions and the logical function and a second combination of a first and a second set of trigger conditions and the logical function, and the checking means and the combining means are arranged to use the first combination for radio signals from or to active base stations having an active link with the mobile station and the second combination is used for radio signals from or to candidate base stations not having an active link with the mobile station.

24. A base station for a telecommunication system comprising mobile stations and a network comprising base stations, wherein the base stations send radio signals monitored by the mobile stations, the base station comprising:

a first defining means for defining first and second sets of trigger conditions corresponding, respectively, to radio signal properties in uplink and downlink directions, and a second defining means for defining a logical function for combining said first and second sets of trigger conditions.

25. The base station according to claim 24, wherein the base station further comprises:

transmitting means for transmitting the defined first and second sets of trigger conditions and the defined logical function to at least one mobile station.

26. The base station according to claim 25, wherein the base station further comprises:

measurement report receiving means for receiving a measurement report from a mobile station, the measurement report having been prepared by said mobile station on the basis of states of the first and second sets of trigger conditions and the logical function transmitted to said mobile station.

* * * * *